US012294176B2

(12) United States Patent
Nakai

(10) Patent No.: US 12,294,176 B2
(45) Date of Patent: May 6, 2025

(54) CONNECTOR

(71) Applicant: YAZAKI CORPORATION, Tokyo (JP)

(72) Inventor: Satoshi Nakai, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 382 days.

(21) Appl. No.: 17/965,767

(22) Filed: Oct. 14, 2022

(65) Prior Publication Data

US 2023/0121828 A1 Apr. 20, 2023

(30) Foreign Application Priority Data

Oct. 19, 2021 (JP) ................................ 2021-171080

(51) Int. Cl.
*H01R 13/52* (2006.01)

(52) U.S. Cl.
CPC ................................ *H01R 13/5213* (2013.01)

(58) Field of Classification Search
None
See application file for complete search history.

(56) References Cited

U.S. PATENT DOCUMENTS 5,882,226 A * 3/1999 Bell ..................... H01R 13/567 439/11
6,162,087 A * 12/2000 Hiura ................. H01R 13/5213 174/152 G
6,438,828 B1 * 8/2002 Uchiyama .............. H02G 3/088 174/152 G
9,040,846 B2 * 5/2015 Suzuki ................. H01R 13/648 174/359
9,376,069 B2 * 6/2016 Nakai ................ H01R 13/5219
10,177,552 B2 * 1/2019 Nakai .................. H02G 3/0691
2011/0045701 A1 * 2/2011 Tsuruta ............ H01R 13/65912 439/607.53
2015/0318679 A1 11/2015 Nakai et al.
2020/0321738 A1 10/2020 Akagi et al.
2021/0320450 A1 * 10/2021 Lee .................. H01R 13/65912

FOREIGN PATENT DOCUMENTS

JP 2011-44354 A 3/2011
JP 2014-60844 A 4/2014
JP 2015-76381 A 4/2015
JP 2020-173895 A 10/2020

* cited by examiner

*Primary Examiner* — Tho D Ta
(74) *Attorney, Agent, or Firm* — KENEALY VAIDYA LLP

(57) ABSTRACT

A connector includes: a terminal fitting; an electric wire connected to the terminal fitting; a housing in which the terminal fitting is stored; a shield shell disposed so as to surround an outer periphery of the housing; and a waterproof cover having a tubular shape and made of an elastic material, the waterproof cover being provided so as to surround an outer periphery of the shield shell and configured to be in close contact with the outer periphery of the shield shell. The shield shell is brought into close contact with a close-contact portion of the waterproof cover. The waterproof cover includes at least one protruding strip portion provided at the close-contact portion, the at least one protruding strip portion protruding from a tubular inner surface of the waterproof cover and extending in a peripheral direction.

2 Claims, 3 Drawing Sheets

CONNECTOR

CROSS-REFERENCE TO RELATED APPLICATIONS

This application is based on and claims priority under 35 USC 119 from Japanese Patent Application No. 2021-171080 filed on Oct. 19, 2021, the contents of which are incorporated herein by reference.

TECHNICAL FIELD

The present disclosure relates to a connector.

BACKGROUND ART

JP2020-173895A discloses a connector including a waterproof cover (for example, a boot, a grommet, or the like) for waterproofing a connection part between an electric wire and a terminal by isolating the connection part from the surroundings.

SUMMARY OF INVENTION

The waterproof cover (grommet or the like) as described above is generally made of an elastic material such as rubber. The waterproof cover is disposed to surround a housing or the like of the connector, and comes into close contact with the housing or the like by the waterproof cover itself elastically contracting. However, for example, in a case where a waterproof cover having a small thickness is used from the viewpoint of downsizing of the connector, when an external force is applied to the waterproof cover for the reason that an electric wire extending from the connector is pulled at the time of wiring or the like, a state in which the waterproof cover is appropriately in close contact with the housing or the like may not be maintained, and a gap may be generated between the housing and the waterproof cover. Such a gap is not preferable because it may cause waterproof performance of the waterproof cover to be impaired.

An object of the present disclosure is to provide a connector capable of appropriately maintaining waterproof performance.

The present disclosure provides a connector includes: a terminal fitting; an electric wire connected to the terminal fitting; a housing in which the terminal fitting is stored; a shield shell disposed so as to surround an outer periphery of the housing; and a waterproof cover having a tubular shape and made of an elastic material, the waterproof cover being provided so as to surround an outer periphery of the shield shell and configured to be in close contact with the outer periphery of the shield shell, wherein the shield shell is brought into close contact with a close-contact portion of the waterproof cover, and wherein the waterproof cover includes at least one protruding strip portion provided at the close-contact portion, the at least one protruding strip portion protruding from a tubular inner surface of the waterproof cover and extending in a peripheral direction.

The present disclosure is briefly described as above. Further, details of the present disclosure will be further clarified by reading through an embodiment of the present disclosure to be described below with reference to the accompanying drawings.

DESCRIPTION OF EMBODIMENTS

Embodiment

Hereinafter, a connector 1 according to an embodiment of the present disclosure will be described with reference to the drawings. The connector 1 shown in FIG. 1 functions as a relay connector that electrically connects a pair of electric wires 20 of the connector 1 and a counterpart connector (not shown) to be fitted to the connector 1.

Figure 1:
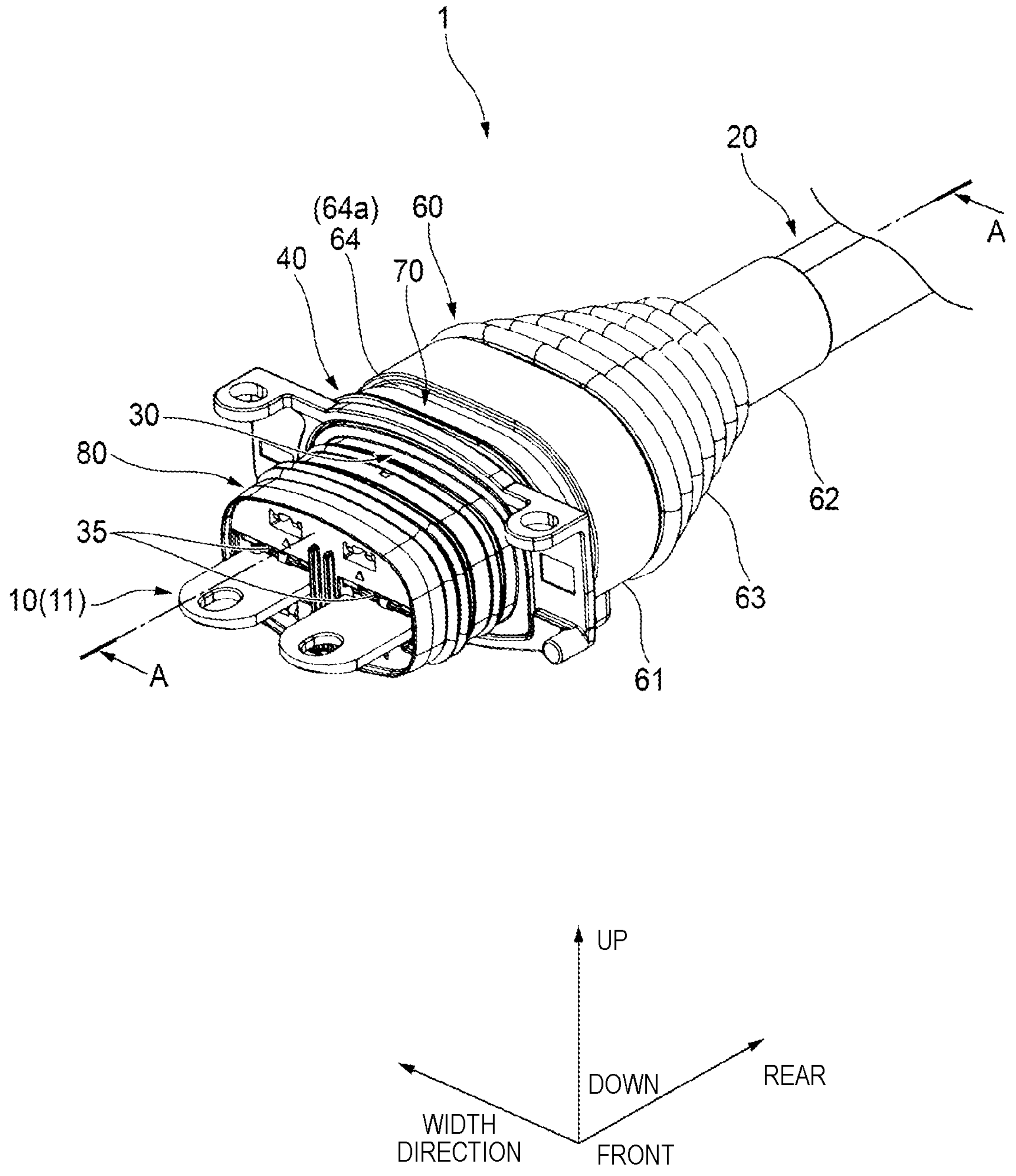
FIG. 1 is a perspective view showing a connector according to an embodiment of the present disclosure.
Figure 2:
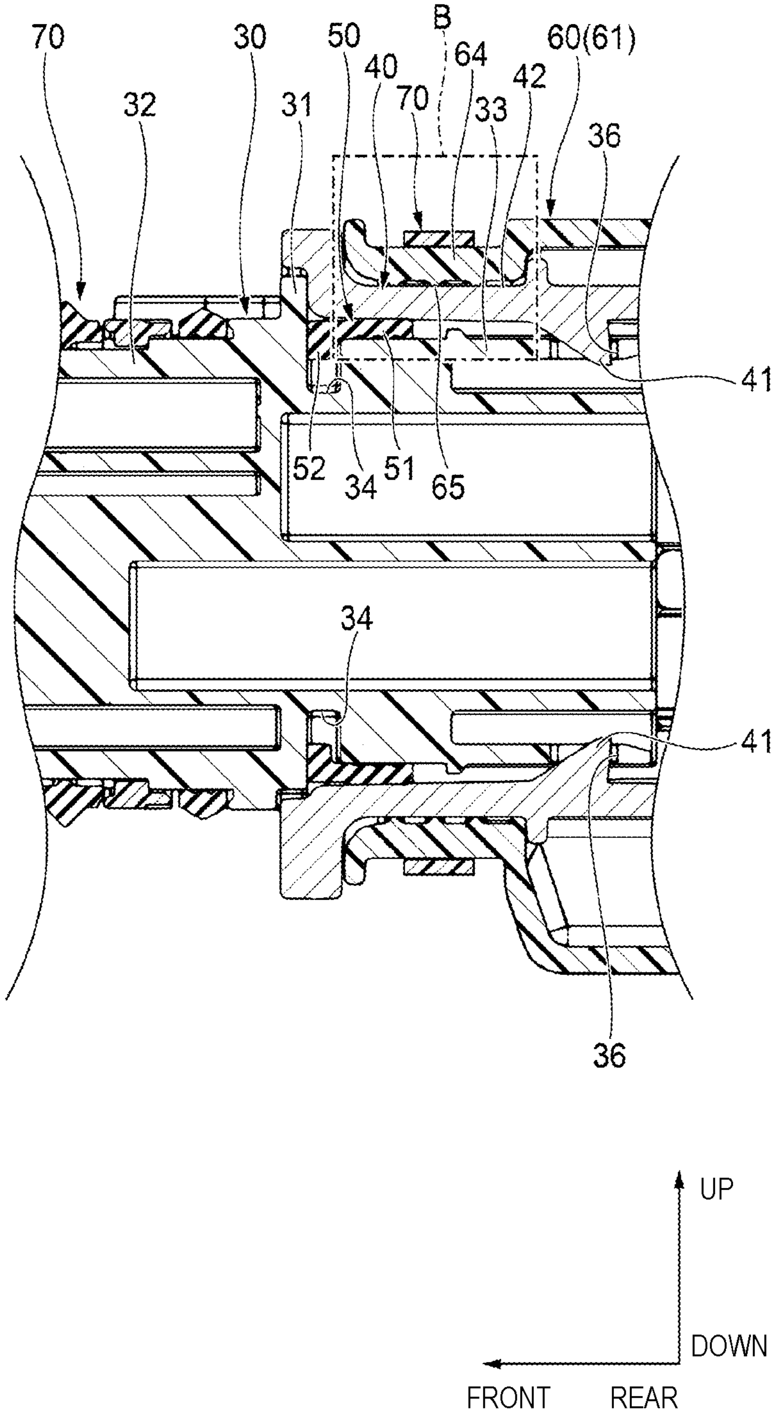
FIG. 2 is a view showing a main part on a cross section taken along a line A-A of FIG. 1.
Figure 3:
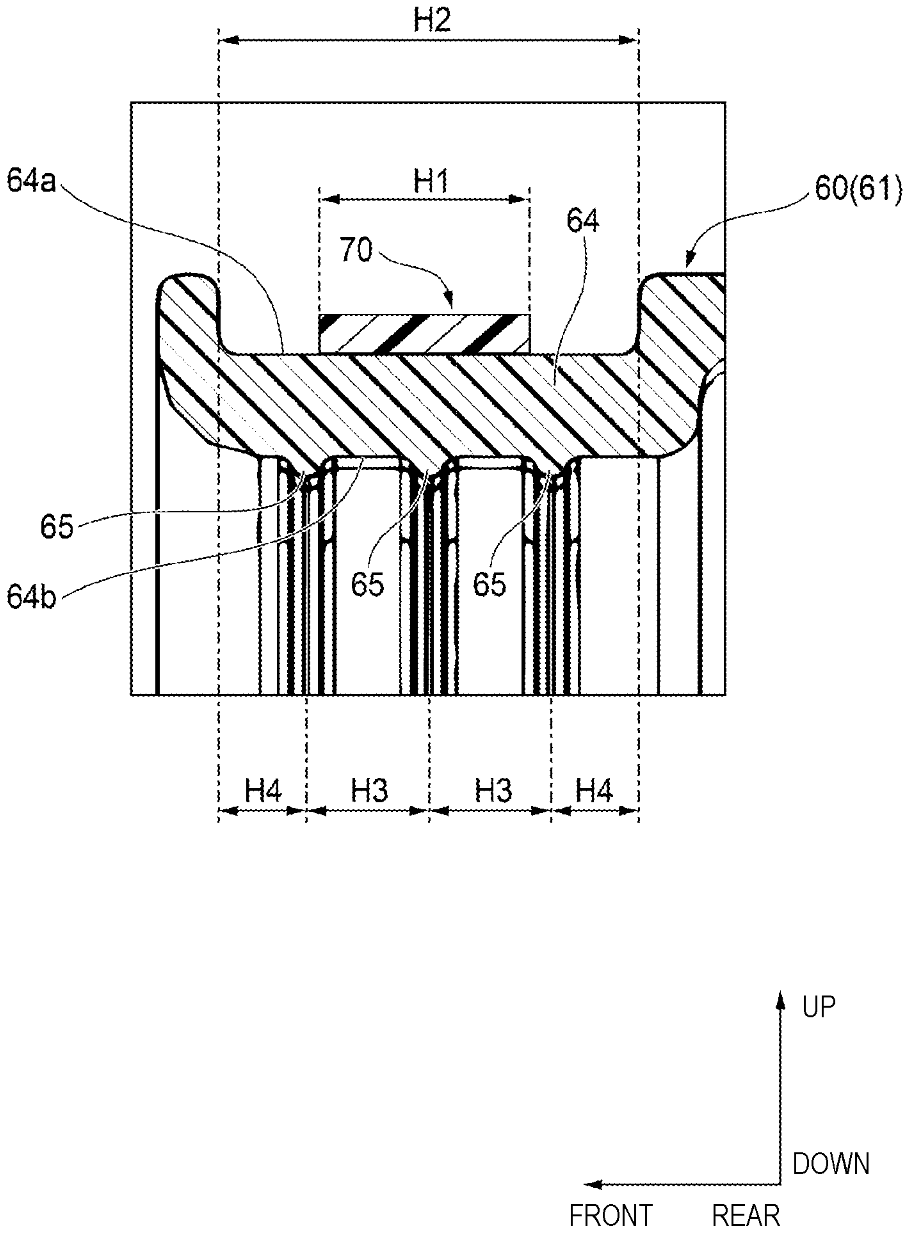
FIG. 3 is an enlarged view of a portion B in FIG. 2.

Hereinafter, for convenience of description, as shown in FIGS. 1 to 3, a “front-rear direction”, an “upper-lower direction”, and a “width direction” are defined. The “front-rear direction”, the “upper-lower direction”, and the “width direction” are orthogonal to each other. The front-rear direction coincides with a fitting direction of the connector 1 and the counterpart connector, and “front” and “rear” respectively correspond to an advancing side and a retreating side of the fitting of the connector 1 with the counterpart connector.

As shown in FIGS. 1 and 2, the connector 1 includes a pair of terminal fittings 10, a pair of electric wires 20 connected to the pair of terminal fittings 10, a housing 30 in which the pair of terminal fittings 10 is stored, a shield shell 40 mounted on the housing 30 from a rear side, a seal member 50 sandwiched between the housing 30 and the shield shell, a grommet 60 covering the shield shell 40 and the pair of electric wires 20, a tie band 70 attached to the grommet 60, and a packing 80 mounted on the housing 30 from a front side. Hereinafter, each member constituting the connector 1 will be described in order.

First, the terminal fitting 10 and the electric wire 20 will be described. The terminal fitting 10 is formed by performing pressing, bending and the like on a metal plate and has a shape extending in the front-rear direction. The terminal fitting 10 integrally includes an elongated flat plate-shaped terminal portion 11 (see FIG. 1) extending in the front-rear direction, and a connection portion (not shown) located at a rear end portion of the terminal portion 11. An end portion of the electric wire 20 is connected to the connection portion of the terminal fitting 10.

The electric wire 20 includes a conductor core wire made of metal and an insulating sheath covering the conductor core wire. At the end portion of the electric wire 20, the insulating sheath is removed to expose the conductor core wire, and the connection portion of the terminal fitting 10 is crimped and fixed to the exposed conductor core wire. Thus, the electric wire 20 connected to the terminal fitting 10 extends rearward from the connection portion of the terminal fitting 10.

Next, the housing 30 will be described. The housing 30 is a resin molded product. As shown in FIGS. 1 and 2, the housing 30 has a tubular shape extending in the front-rear direction, and has a flat shape elongated in a width direction when viewed in the front-rear direction. A flange portion 31 that protrudes outward in a radial direction is formed on an outer periphery of a central portion of the first housing 30 in the front-rear direction over the entire periphery. A portion of the housing 30 on the front side of the flange portion 31 constitutes a fitting portion 32 that is inserted into and fitted to a tubular counterpart fitting portion (not shown) of the counterpart connector, and a portion of the first housing 30 on the rear side of the flange portion 31 constitutes an insertion portion 33 that is inserted into the shield shell 40 (see FIG. 2). An annular groove portion 34 recessed inward in the radial direction is formed in a boundary portion between the insertion portion 33 and the flange portion 31 (see FIG. 2).

In the housing 30, a pair of terminal insertion holes 35 (see FIG. 1) and a pair of terminal storing chambers (not shown) are formed in this order from the front side toward the rear side at respective pairs of positions arranged at intervals in the width direction so as to communicate with each other in the front-rear direction. A front end of the terminal insertion hole 35 opens to a front end of the first housing 30 (a front end of the fitting portion 32), and a rear end of the terminal storing chamber opens to a rear end of the first housing 30 (a rear end of the insertion portion 33).

The pair of terminal fittings 10 to which end portions of the pair of electric wires 20 are connected are stored in the housing 30. Therefore, each terminal fitting 10 is inserted into the housing 30 from the rear side. As a result, the terminal portions 11 are inserted into the corresponding terminal insertion holes 35, and the connection portions are stored in the corresponding terminal storing chambers. In a state in which the terminal fittings 10 are completed inserted, front portions of the pair of terminal portions 11 protrude forward from the front end of the housing 30 (the front end of the fitting portion 32) (see FIG. 1), and the pair of electric wires 20 extending rearward from the pair of terminal fittings 10 extends rearward from the rear end of the housing 30 (the rear end of the insertion portion 33) (see FIG. 1). If necessary, a packing that is sandwiched between an outer peripheral surface of the electric wire 20 and an inner peripheral surface of the terminal storing chamber to seal an annular gap therebetween, a holder that prevents the packing from falling off to the rear side, or the like may be provided.

Next, the shield shell 40 and the seal member 50 will be described. As shown in FIGS. 1 and 2, the shield shell 40 made of metal has a tubular shape extending in the front-rear direction so as to be externally inserted into the insertion portion 33 of the housing 30. As shown in FIG. 2, an annular storing recessed portion 42 that is recessed in the radial direction and extends in the front-rear direction is formed in an outer peripheral surface of the shield shell 40 in the vicinity of a front end. A close-contact portion 64 (see FIGS. 2 and 3), which will be described later, of the grommet 60 is stored in the storing recessed portion 42 (see FIG. 2). The shield shell 40 is mounted to the insertion portion 33 of the housing 30 from the rear side, and has a function of preventing electromagnetic noise from being transmitted to the pair of electric wires 20 located inside the housing 30.

The seal member 50 has a function of sealing an annular gap between the insertion portion 33 of the housing 30 and the shield shell 40 externally inserted into the insertion portion 33. As shown in FIG. 2, the seal member 50 made of rubber includes a tubular main body portion 51 extending in the front-rear direction and an annular protrusion 52 protruding inward in the radial direction from a front end of the main body portion 51.

The seal member 50 is disposed so as to be sandwiched between the insertion portion 33 of the housing 30 and the shield shell 40 (see FIG. 2). Therefore, first, the seal member 50 is mounted on the insertion portion 33 from the rear side such that the protrusion 52 enters the annular groove portion 34 and the main body portion 51 covers an outer periphery of the insertion portion 33 (see FIG. 2). In this state, the protrusion 52 of the seal member 50 entering the annular groove portion 34 exhibits a function of preventing the seal member 50 from falling off to the rear side from the insertion portion 33. Next, the shield shell 40 is mounted on the insertion portion 33 so as to be externally inserted into the insertion portion 33 from the rear side (see FIG. 2). In a state in which the shield shell 40 is completely mounted, as shown in FIG. 2, a locking pieces 41 provided in the shield shell 40 and a locking hole 36 provided in the outer periphery of the insertion portion 33 are engaged with each other, so that the shield shell 40 is prevented from falling off to the rear side from the housing 30.

When the shield shell 40 is mounted, the main body portion 51 of the seal member 50 is pressed and sandwiched between the insertion portion 33 of the housing 30 and the shield shell 40. As a result, the main body portion 51 exerts a function of sealing the annular gap between the insertion portion 33 and the shield shell 40.

Next, the grommet 60 and the tie band 70 will be described. As shown in FIG. 1, the grommet 60 made of rubber has a tubular shape extending in the front-rear direction, and integrally includes a large diameter portion 61 that covers an outer periphery of the shield shell 40, a small diameter portion 62 that covers the outer peripheries of the pair of electric wires 20 extending rearward from the shield shell 40, and a connecting portion 63 that connects the large diameter portion 61 and the small diameter portion 62. The grommet 60 protects the pair of electric wires 20 extending rearward from the shield shell 40, and isolates the connection part between the terminal fittings 10 and the electric wires 20 from the surroundings to waterproof the connection part.

As shown in FIG. 2, in the vicinity of a front end of the large diameter portion 61, the annular close-contact portion 64 having an outer peripheral side recessed inward in the radial direction and an inner peripheral side protruding inward in the radial direction is provided so as to extend in the front-rear direction. That is, an outer peripheral recessed portion **64*a* recessed inward in the radial direction as compared with other portions of the large diameter portion 61 is formed on the outer peripheral side of the close-contact portion 64, and an inner peripheral protruding portion 64*b* protruding inward in the radial direction as compared with other portions of the large diameter portion 61 is formed on the inner peripheral side of the close-contact portion 64 (see FIG. 3**).

On a top surface (tubular inner surface) of the inner peripheral protruding portion **64*b* of the close-contact portion 64, a plurality of (three in the present embodiment) protruding strip portions 65** protruding inward in the radial direction and extending in a peripheral direction are provided to be arranged at equal intervals in the front-rear direction.

The tie band 70 is a member that is attached to the outer peripheral recessed portion **64*a* of the close-contact portion 64 of the grommet 60, and has a function of improving waterproof property of the grommet 60 (see FIGS. 1 to 3). In the present example, the tie band 70** is made of resin or rubber, and has an annular and belt shape.

The grommet 60 is relatively moved forward with respect to the pair of electric wires 20 from a state in which the pair of electric wires 20 is inserted through the grommet 60 and the large diameter portion 61 is mounted on the outer periphery of the shield shell 40 such that the close-contact portion 64 is stored in the storing recessed portion 42, so that the grommet 60 is mounted on the shield shell 40 and the pair of electric wires 20. In a state in which the grommet 60 is completely mounted, the close-contact portion 64 of the large diameter portion 61 is mounted on a bottom surface of the storing recessed portion 42 in a state in which the close-contact portion 64 is elastically slightly expanded in diameter. As a result, the plurality of protruding strip portions 65 of the close-contact portion 64 are in close contact with the bottom surface of the storing recessed portion 42 in a state of being pressed against the bottom surface by an elastic restoring force of the close-contact portion 64 toward inward in the radial direction.

Here, since the plurality of protruding strip portions 65 are provided in the close-contact portion 64 of the grommet 60, the close-contact portion 64 itself is less likely to be deformed (elastic modulus of the close-contact portion 64 as a whole is increased) as compared with a case where such protruding strip portions 65 are not provided. As a result, an elastic restoring force of the close-contact portion 64 as a whole increases, so that the adhesion of the close-contact portion 64 to the storing recessed portion 42 is increased. Further, the elastic restoring force of the close-contact portion 64 inward in the radial direction acts on the plurality of protruding strip portions 65 in a concentrated manner, so that a contact surface pressure between the plurality of protruding strip portions 65 and the bottom surface of the storing recessed portion 42 increases. As a result, the waterproof property of the grommet 60 is improved.

After the mounting of the grommet 60 is completed, the tie band 70 is relatively moved forward with respect to the pair of electric wires 20 and the grommet 60 from a state in which the pair of electric wires 20 is inserted through the tie band 70, and is attached to a bottom surface of the outer peripheral recessed portion 64*a* so as to cover the close-contact portion 64 of the grommet 60. In a state in which the tie band 70 is completely mounted to the outer peripheral recessed portion 64*a*, the tie band 70 is attached to the bottom surface of the outer peripheral recessed portion 64*a* in a state in which the tie band 70 is elastically slightly expanded in diameter. As a result, the elastic restoring force (fastening force) inward in the radial direction of the tie band 70 is applied to the protruding strip portions 65 of the close-contact portion 64, and the contact surface pressure between the protruding strip portions 65 and the bottom surface of the storing recessed portion 42 further increases. As a result, the waterproof property of the grommet 60 is further improved.

Here, as shown in FIG. 3, a length H1 of the tie band 70 in the front-rear direction is smaller than a length H2 of the outer peripheral recessed portion 64*a* in the front-rear direction, and is larger than an interval H3 in the front-rear direction between the protruding strip portions 65 adjacent to each other in the front-rear direction. Further, the length H1 of the tie band in the front-rear direction is larger than an interval H4 in the front-rear direction between a front end (rear end) of the outer peripheral recessed portion 64*a* and the protruding strip portion 65 located on the frontmost side (rearmost side).

Therefore, even if the tie band 70 is attached at any position in the front-rear direction between a front end position at which a front end of the tie band 70 abuts against the front end of the outer peripheral recessed portion 64*a* and a rear end position at which a rear end of the tie band 70 abuts against the rear end of the outer peripheral recessed portion 64*a*, at least one of the plurality of protruding strip portions 65 is present at a position corresponding to the inside of a ring of the tie band 70. As a result, it is ensured that the elastic restoring force (fastening force) of the tie band 70 inward in the radial direction is applied to at least one protruding strip portion 65, and thus an effect of improving the waterproof property of the grommet 60 described above by the tie band 70 can be reliably exhibited.

Next, the packing 80 will be described. As shown in FIG. 1, the rubber packing 80 made of rubber has a tubular shape extending in the front-rear direction, and has a flat shape elongated in the width direction corresponding to an outer peripheral shape of the fitting portion 32 of the housing 30 when viewed in the front-rear direction. The packing 80 is mounted on the outer periphery of the fitting portion 32 of the housing 30 from the front side (see FIG. 1). In a state in which the tubular counterpart fitting portion of the counterpart connector is externally inserted into the fitting portion 32 by fitting of the connector 1 and the counterpart connector, the packing 80 mounted on the fitting portion 32 is pressed and sandwiched between an outer peripheral surface of the fitting portion 32 and an inner peripheral surface of the counterpart fitting portion. This provides a function of sealing a gap between the fitting portion 32 and the counterpart fitting portion. The members constituting the connector 1 have been described above.

The assembled connector 1 is fitted to the counterpart connector. In order to fit the connector 1 and the counterpart connector to each other, a tubular counterpart fitting portion of the counterpart connector is externally inserted into the fitting portion 32 of the connector 1. As a result, the connector 1 can function as a relay connector that electrically connects the pair of electric wires 20 and the counterpart connector.

Functions and Effects

As described above, according to the connector 1 of the present embodiment, the protruding strip portions 65 protruding from the tubular inner surface of the grommet 60 and extending in the peripheral direction are provided on the grommet 60. Since rigidity of the grommet 60 itself is increased and the grommet 60 is less likely to be deformed by the protruding strip portions 65, the adhesion when the grommet 60 is attached to the shield shell 40 is improved. Further, since an elastic force when the grommet 60 is elastically contracted is concentrated on the protruding strip portions 65, the waterproof performance is also improved. Therefore, even if the grommet 60 is attached to a member that is generally made of a metal material and has a small degree of deformation with respect to an external force (in other words, a large difference from a deformation amount of the grommet 60) like the shield shell 40, a state in which the grommet 60 is in close contact with the shield shell 40 is maintained, and a gap or the like is less likely to occur between the grommet 60 and the shield shell 40. Therefore, the connector 1 according to the present embodiment can maintain the waterproof performance appropriately.

Further, when the tie band 70 is wound around the grommet 60, at least one of the plurality of protruding strip portions 65 is located at a position corresponding to the inside of the ring of the tie band 70. As a result, the fastening force of the tie band 70 is appropriately applied to at least one protruding strip portion 65. Therefore, the waterproof performance can be more appropriately maintained.

Other Embodiments

The present disclosure is not limited to the above embodiment, and various modifications can be adopted within the scope of the present invention. For example, the present disclosure is not limited to the above embodiment, and may be appropriately modified, improved or the like. In addition, the material, shape, size, number, arrangement position, and the like of each component in the embodiments described above are optional and are not limited as long as the disclosure can be achieved.

In the above embodiment, the grommet 60 includes a plurality of protruding strip portions 65. Alternatively, the grommet 60 may have one single protruding strip portion 65.

Further, in the above embodiment, the tie band 70 is attached to the outer periphery of the close-contact portion 64 of the grommet 60 with the shield shell 40. Alternatively, such a tie band 70 may be omitted.

Here, the connector 1 according to the embodiment of the present disclosure described above will be briefly summarized and listed in [1] and [2] below.

[1] A connector (1) including: a terminal fitting (10); an electric wire (20) connected to the terminal fitting (10); a housing (30) in which the terminal fitting (10) is stored; a shield shell (40) disposed so as to surround an outer periphery of the housing (30); and a waterproof cover (60) having a tubular shape and made of an elastic material, the waterproof cover (60) being provided so as to surround an outer periphery of the shield shell (40) and configured to be in close contact with the outer periphery of the shield shell (40), wherein the shield shell (40) is brought into close contact with a close-contact portion (64) of the waterproof cover (60), wherein the waterproof cover (60) includes at least one protruding strip portion (65) provided at the close-contact portion (64), the at least one protruding strip portion (65) protruding from a tubular inner surface of the waterproof cover (60) and extending in a peripheral direction.

According to the connector having the configuration [1], the waterproof cover (for example, a grommet or the like) is provided with the at least one protruding strip portion that protrudes from the tubular inner surface of the waterproof cover and extends in the peripheral direction. Since rigidity of the waterproof cover itself is increased and the waterproof cover is less likely to be deformed by the protruding strip portion, the adhesion when the waterproof cover is attached to the shield shell is improved. Further, since an elastic force when the waterproof cover attached to the shield shell is elastically contracted is concentrated on the protruding strip portions, the waterproof performance is also improved. Therefore, even if the waterproof cover is attached to a member that is generally made of a metal material and has a small degree of deformation with respect to an external force (in other words, a large difference from a deformation amount of the waterproof cover) like the shield shell, a state in which the waterproof cover is in close contact with the shield shell is maintained, and a gap or the like is less likely to occur between the waterproof cover and the shield shell. Therefore, the connector of this configuration can appropriately maintain the waterproof performance even when an external force is applied to the waterproof cover.

[2] The connector (1) according to [1], further including:

a tie band (70) having a belt shape, the tie band (70) being attached to the waterproof cover (60) so as to surround the close-contact portion (64) and configured to tighten the waterproof cover (60) and the shield shell (40) radially inward, wherein the at least one protruding strip portion (65) includes a plurality of protruding strip portions (65) provided at the close-contact portion (64), and wherein at least one of the plurality of protruding strip portions (65) is present at a position corresponding to an inside of a ring of the tie band (70).

According to the connector having the configuration [2], when the tie band is wound around the grommet, at least one of the plurality of protruding strip portions is located at the position corresponding to the inside of the ring of the tie band. As a result, a fastening force of the tie band is appropriately applied to at least one protruding strip portion. Therefore, the waterproof performance can be more appropriately maintained.

What is claimed is:

1. A connector comprising:

a terminal fitting;

an electric wire connected to the terminal fitting;

a housing in which the terminal fitting is stored;

a shield shell disposed so as to surround an outer periphery of the housing; and a waterproof cover having a tubular shape and made of an elastic material, the waterproof cover being provided so as to surround an outer periphery of the shield shell and configured to be in close contact with the outer periphery of the shield shell, wherein the shield shell is brought into close contact with a close-contact portion of the waterproof cover, wherein the waterproof cover comprises at least one protruding strip portion provided at the close-contact portion, the at least one protruding strip portion protruding from a tubular inner surface of the waterproof cover and extending in a peripheral direction, and wherein the housing includes a flange portion that protrudes radially outwardly from an outer periphery of the housing and the shield shell abuts the flange portion.

2. The connector according to claim 1, further comprising:

a tie band having a belt shape, the tie band being attached to the waterproof cover so as to surround the close-contact portion and configured to tighten the waterproof cover and the shield shell radially inward, wherein the at least one protruding strip portion comprises a plurality of protruding strip portions provided at the close-contact portion, and wherein at least one of the plurality of protruding strip portions is present at a position corresponding to an inside of a ring of the tie band.

* * * * *